(12) United States Patent
Lee

(10) Patent No.: US 8,952,939 B2
(45) Date of Patent: Feb. 10, 2015

(54) CONDUCTIVE BRUSH FOR USE WITH A COMPUTING DEVICE

(75) Inventor: Don Lee, Portland, OR (US)

(73) Assignee: Nomadbrush LLC, Portland, OR (US)

( * ) Notice: Subject to any disclaimer, the term of this patent is extended or adjusted under 35 U.S.C. 154(b) by 655 days.

(21) Appl. No.: 13/105,755

(22) Filed: May 11, 2011

(65) Prior Publication Data

US 2012/0098798 A1    Apr. 26, 2012

Related U.S. Application Data

(60) Provisional application No. 61/406,576, filed on Oct. 26, 2010.

(51) Int. Cl.
*B44F 11/02*    (2006.01)
*G06F 3/0354*    (2013.01)

(52) U.S. Cl.
CPC ............ *G06F 3/03545* (2013.01); *B44F 11/02* (2013.01)
USPC .............................................. 345/179; 703/6

(58) Field of Classification Search
CPC ....... G06F 3/01; G06F 3/033; G06F 3/03545; G06F 3/048; B44F 11/02
USPC .......... 178/18.01, 18.03, 18.04, 18.07, 19.01, 178/20.01; 219/216; 345/173, 174, 179; 346/139 C; 703/6
See application file for complete search history.

(56) References Cited

U.S. PATENT DOCUMENTS

| | | | | |
|---|---|---|---|---|
| 5,420,607 A | * | 5/1995 | Miller et al. | 345/156 |
| 5,432,896 A | * | 7/1995 | Hwong et al. | 345/592 |
| 5,488,204 A | * | 1/1996 | Mead et al. | 178/18.06 |
| 5,500,925 A | * | 3/1996 | Tolson | 345/581 |
| 5,542,144 A | * | 8/1996 | Forsline | 15/245.1 |
| 5,646,650 A | * | 7/1997 | Miller et al. | 345/179 |
| 5,767,843 A | * | 6/1998 | Wagner et al. | 345/179 |
| 5,767,860 A | * | 6/1998 | Zimmer et al. | 345/441 |
| 5,861,878 A | * | 1/1999 | Lee | 345/179 |

(Continued)

FOREIGN PATENT DOCUMENTS

CN    101598979 A    12/2009
KR    10-2010-0090139 A    8/2010

OTHER PUBLICATIONS

PCT International Search Report corresponding to PCT/US2011/057724, Feb. 20, 2012, 2 pages.

(Continued)

*Primary Examiner* — Michael J Eurice
(74) *Attorney, Agent, or Firm* — Innovation Counsel LLP (57) ABSTRACT

A conductive brush, or stylus, for use with touch screen computing devices. The bristles or filaments are attached to an electrically conductive ferrule, so that even when the brush is pressed against the tablet to make the bristles splay apart, the conductive ferrule itself maintains electrical communication with the tablet. The brush thus allows users to conduct paint operations in an uninterrupted manner, even when its bristles spread apart. Further, this ferrule can be made removable so that users can swap out different brush heads quickly and easily. Additionally, the ferrule has at least a portion that is flexible, deforming visibly upon application of pressures commonly achieved during a typical painting operation. This deformation at least partially absorbs stresses on the filaments, preventing them from splaying apart excessively during painting, and thus helping to prevent loss of detection by the tablet and/or undesired visual effects.

9 Claims, 11 Drawing Sheets

(56) References Cited

U.S. PATENT DOCUMENTS

| | | | |
|---|---|---|---|
| 5,877,459 A | 3/1999 | Prater | |
| 6,011,536 A * | 1/2000 | Hertzmann et al. | 345/418 |
| 6,137,500 A * | 10/2000 | Silverbrook et al. | 345/442 |
| 6,344,848 B1 * | 2/2002 | Rowe et al. | 345/179 |
| 6,603,463 B1 * | 8/2003 | Rising, III | 345/179 |
| 6,801,211 B2 | 10/2004 | Forsline et al. | |
| 7,384,667 B2 * | 6/2008 | Blanco | 427/208.6 |
| 8,379,047 B1 * | 2/2013 | DiVerdi | 345/592 |
| 8,605,095 B2 * | 12/2013 | DiVerdi et al. | 345/441 |
| 8,610,744 B2 * | 12/2013 | Harris | 345/661 |
| 8,749,572 B2 * | 6/2014 | DiVerdi et al. | 345/592 |
| 8,760,438 B2 * | 6/2014 | DiVerdi et al. | 345/179 |
| 2003/0117408 A1 * | 6/2003 | Forsline et al. | 345/581 |
| 2004/0153204 A1 * | 8/2004 | Blanco | 700/207 |
| 2005/0057535 A1 * | 3/2005 | Liu et al. | 345/179 |
| 2006/0007123 A1 * | 1/2006 | Wilson et al. | 345/156 |
| 2006/0084039 A1 * | 4/2006 | Ryokai et al. | 434/155 |
| 2009/0157366 A1 * | 6/2009 | Shin et al. | 703/9 |
| 2010/0021022 A1 * | 1/2010 | Pittel et al. | 382/123 |
| 2010/0053120 A1 | 3/2010 | Chang et al. | |
| 2011/0298709 A1 * | 12/2011 | Vaganov | 345/158 |
| 2011/0304577 A1 * | 12/2011 | Brown et al. | 345/174 |
| 2013/0181954 A1 * | 7/2013 | Carlos Camargo Do Amaral et al. | 345/179 |

OTHER PUBLICATIONS

PenGo Brush Pen, PenGo Creative Tools, PenGoPaint.com, 1 page.
English Translation of Chinese Publication No. 101598979, Dec. 9, 2009, 5 pages.
English Translation of Korean Publication No. 10-2010-0090139, Aug. 13, 2010, 6 pages.

* cited by examiner

CONDUCTIVE BRUSH FOR USE WITH A COMPUTING DEVICE

CROSS-REFERENCE TO RELATED APPLICATION

This application claims the benefit of U.S. Provisional Patent Application No. 61/406,576, filed on Oct. 26, 2010 and entitled "ARTIST PAINTBRUSH FOR CAPACITIVE TOUCHPAD DEVICE," which is hereby incorporated by reference in its entirety.

BRIEF DESCRIPTION

Embodiments of the invention relate generally to brushes. More specifically, embodiments of the invention relate to conductive brushes for use with computing devices.

BACKGROUND

The advent of tablet-type touch screen computing devices has also given rise to the use of specialized brushes which, in conjunction with the proper software, allow users to effectively "paint" on the tablet's screen. More specifically, these brushes are designed to be conductive, so that contact with the touch screen signals a touch to the tablet. The conductive brush thus acts similar to a human finger, triggering a touch and allowing users to paint, or apply digital color patterns to, any desired area of the screen, with the added benefit that the application of color or other patterns can be done as a conventional brush would apply paint. This allows users to produce digital "paintings" that can have the look and varied textures of brush strokes, with the added benefit that the resulting works are electronic documents that can be easily and almost arbitrarily stored or modified, unlike paint on an easel.

Conventional conductive brushes, sometimes also referred to as styluses, are often designed similar to a standard paint brush, except that the fibers of the brush head, as well as the handle, are conductive. U.S. Pat. No. 5,488,204 to Mead et al. provides one such example. These brushes, however, suffer from certain drawbacks. For example, the brushes use no actual paint, and therefore have no medium that can act to hold their fibers together during painting. The fibers thus tend to splay apart excessively, diminishing the electrical conductivity of the brush and thus losing detection by the tablet, as well as possibly producing undesired visual effects on the digital canvas. Ongoing efforts thus exist to improve the performance of conductive brushes.

SUMMARY

The invention can be implemented in many ways. In one embodiment, a conductive brush for use with a computing device comprises a ferrule comprising a conductive elastomer and having a first end and an opposite second end, electrically conductive filaments, and an electrically conductive handle. The electrically conductive filaments are attached to the first end of the ferrule, and the second end of the ferrule is coupled to the handle, so as to place the electrically conductive filaments and the conductive elastomer of the ferrule in electrical communication with the handle.

In another embodiment, a stylus for use with a computing device comprises an electrically conductive handle, and a ferrule having a first end and an opposite second end, wherein at least a portion of the ferrule is flexible and electrically conductive. Electrically conductive filaments are attached to the first end and the second end is coupled to the handle, so as to place the filaments in electrical communication with the handle.

In a further embodiment, a conductive brush for use with a computing device comprises an electrically conductive handle having a first end and an opposite second end, and filaments coupled to the handle so as to be placed in electrical communication therewith. The filaments comprise both conductive fibers and animal hairs.

Other aspects and advantages of the invention will become apparent from the following detailed description taken in conjunction with the accompanying drawings which illustrate, by way of example, the principles of the invention.

BRIEF DESCRIPTION OF THE DRAWINGS

For a better understanding of the invention, reference should be made to the following detailed description taken in conjunction with the accompanying drawings, in which:

FIG. 1B illustrates the ferrule and handle of the brush of FIG. 1A and the attachment/detachment thereof, while

FIGS. 6-9 are isometric views of a conductive brush constructed according to further embodiments of the present invention, in which the handle has a conductive tip.

Like reference numerals refer to corresponding parts throughout the drawings.

DETAILED DESCRIPTION

In one embodiment, the invention is a conductive brush, or stylus, for use with touch screen computing devices. The bristles or filaments are attached to a removable ferrule, so that users can swap out different brush heads, allowing them to replace damaged brush heads, or achieve different visual effects, quickly and easily. Additionally, the ferrule has at least a portion that is flexible, deforming visibly upon application of pressures commonly achieved during a typical painting operation. This deformation at least partially absorbs stresses on the filaments, preventing them from splaying apart excessively during painting, and thus helping to prevent loss of detection by the tablet and/or undesired visual effects. Also, the ferrule is electrically conductive so that even when the brush is pressed against the tablet to make the bristles splay apart, the conductive ferrule maintains electrical communication with the tablet. In this manner, the brush better maintains electrical contact with the tablet, even when the bristles splay apart. Further embodiments include additional features such as multi-part handles and handles with conductive tips, which provide further advantages such as space savings and additional drawing functionality.

Figure 1A:
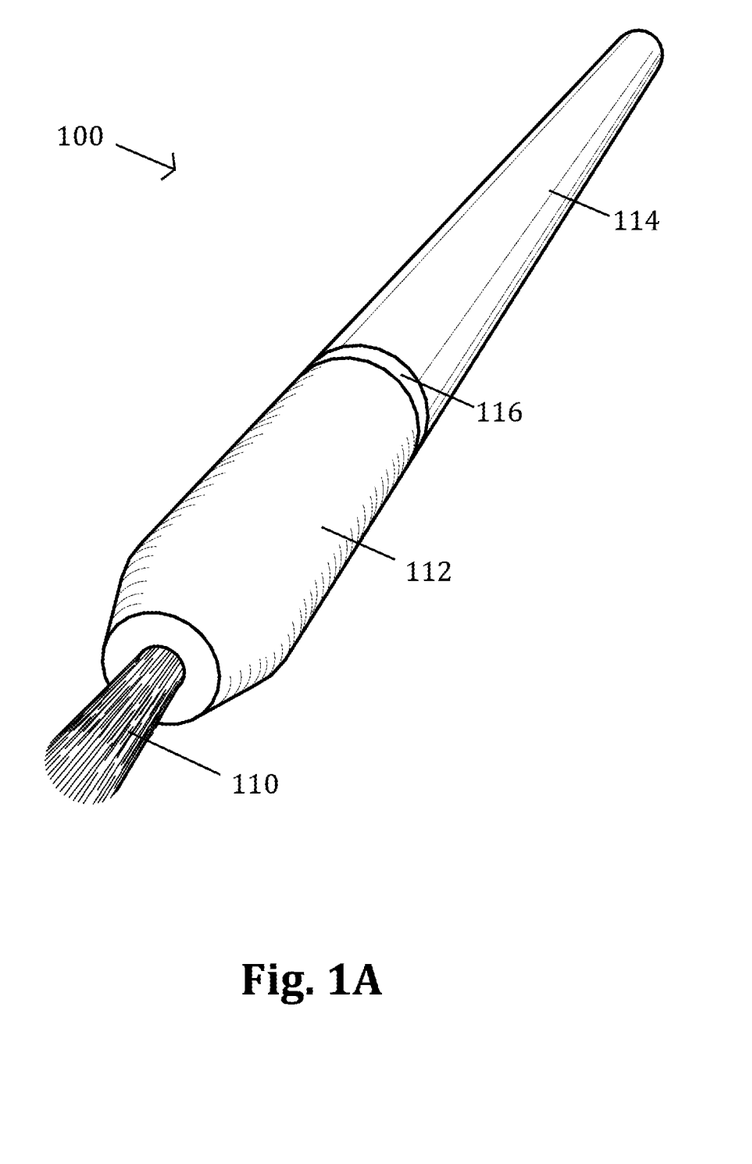
FIG. 1A is an isometric view of a conductive brush constructed according to a first embodiment of the present invention.
Figure 1B:
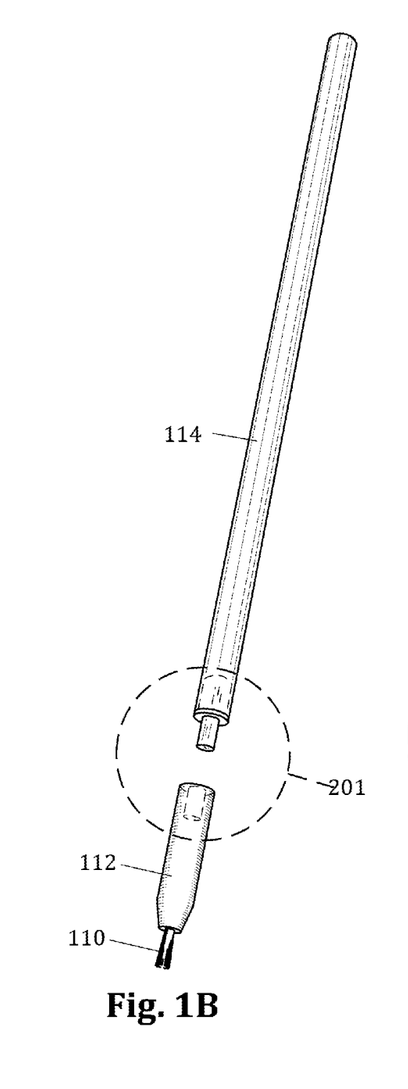
Figure 1C:
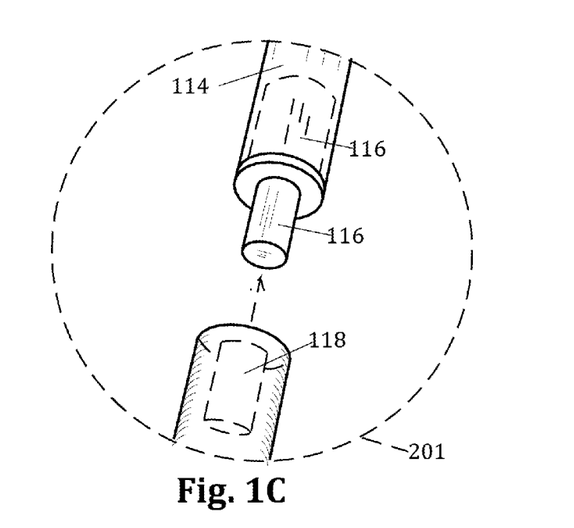
FIGS. 1C-1D are close-up views illustrating further details of FIG. 1B.
Figure 1D:
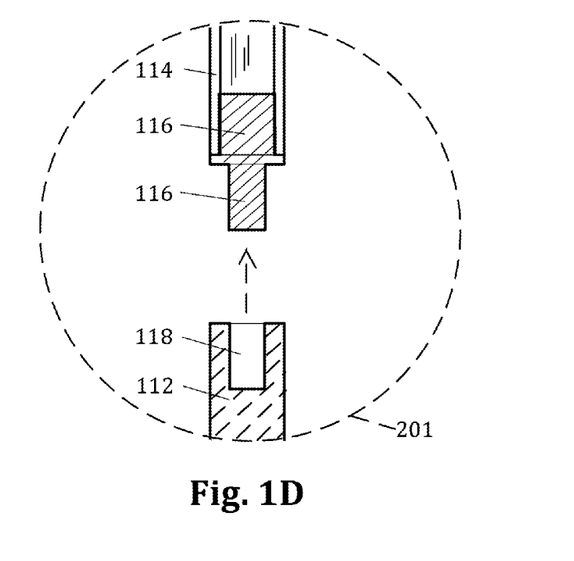

FIG. 1A is an isometric view of a conductive brush constructed according to a first embodiment of the present invention, FIG. 1B illustrates the ferrule and handle of the brush of FIG. 1A and the attachment/detachment thereof, and FIGS. 1C-1D are close-up views of region 201 of the brush of FIG. 1B. In these Figures, a stylus 100 includes conductive filaments 110 affixed to a flexible ferrule 112, and a handle 114 affixable to the ferrule 112 by a dual metal pin 116. The ferrule 112 and handle 114 are designed to be easily detached and reattached, so that multiple different ferrules 112, with different configurations of filaments 110, can be swapped with relative ease.

The filaments 110, ferrule 112, pin 116, and handle 114 collectively provide an electrical pathway between a user's hand and a touch screen. That is, the stylus 100 provides an electrical pathway between its filaments 110 and handle 114 sufficient to allow the touch screen device to detect a touch when a user grasps the handle 114 of the stylus 100 and touches the filaments 110 to the screen during a painting operation.

At least some of the filaments 110 are bristles made of, or containing, a conductive material. For example, the filaments 110 can include bristles made of fine flexible metallic wire, or carbon fiber. In some applications, suitable bristles can be made of acrylic fiber coated with copper sulfide, such as that made and sold under the name Thunderon®. However, not all of the filaments 110 need be conductive. In particular, only a sufficient number of conductive filaments 110 need be present to make the resulting stylus 100 operable to "touch" the touch screen and conduct painting operations. The remaining filaments 110 can be any suitable type of nonconductive fiber. For example, the remaining filaments 110 can be fibers selected to impart the feel and performance of a conventional paintbrush, such as synthetic fibers, animal hairs, or the like. In some applications, it may be desirable for approximately half the filaments 110 to be made of Thunderon®-type fibers, and for the remaining half of the filaments 110 to be made of an animal hair, such as goat hair. However, the invention contemplates any mix or mixes of types of fibers, in any proportions. Any mixes and proportions thereof may vary according to any reason, such as the user's desired brush stiffness/flexibility, brush length, or the like.

The ferrule 112 is a member that is both flexible and provides a conductive pathway between the filaments 110 and handle 114. The ferrule 112 may be a unitary body made of any suitable conductive flexible material. As one example, the ferrule 112 may be made of a conductive elastomer such as Elastosil® plus, supplied by Wacker Chemie AG. The filaments 110 are bonded to one end of the ferrule 112 in such a manner as to electrically connect the filaments 110 to the ferrule 112, such as by using a conductive glue. In this embodiment, the filaments 110 are inserted into a circular recess in the tapered end of the ferrule 112, and bonded to the recess by the conductive glue. The opposite end of the ferrule 112 is shaped to be removably attached to the handle 114. Here, this opposite end of the ferrule 112 has a recess 118 that is sized and shaped to mate with a protruding metal pin 116 that is attached to the handle 114. More specifically, one end of the pin 116 is inserted into a cavity in the handle 114, and bonded to the cavity. This bond can be formed by use of a conductive glue, or by any other suitable means for affixing the pin 116 to the handle in a manner that generates an electrical connection between pin 116 and handle 114. For example, one end of the pin 116 and the side wall of the cavity of handle 114 can be threaded, so that the pin 116 can be screwed into the handle 114. Likewise, the other end of the pin 116 and the recess 118 can also be threaded, so that ferrule 112 can be screwed onto the pin 116.

In the embodiment of FIGS. 1A-1D, the recess 118 is sized to correspond to the protruding end of pin 116, so that sufficient friction exists between the ferrule 112 and pin 116 to hold the ferrule 112 onto pin 116. This friction fit allows the ferrule 112 to be relatively securely attached to the handle 114 during use, while also allowing for easy detachment and use of multiple different ferrules 112.

The handle 114 is sized and shaped for gripping by a user, and has at least portions that are of sufficient conductivity to produce an electrical connection between the user's hand and the filaments 110. For example, the handle 114 can be made of a metal such as aluminum or steel, carbon fiber, or the like. The handle 114 also need not be a unitary structure, but instead can be made of any combination of nonconductive and conductive materials, so long as sufficient conductive material is placed on the outer surfaces of handle 114 to help ensure a reliable electrical connection. For instance, the handle 114 can be made of a wooden core surrounded by a carbon fiber outer layer. The handle 114 can also have a wooden or plastic core with strips or other patterns of metal or carbon fiber inlaid on its outer surfaces.

The ferrule 112, the collar portion of pin 116 (between the two ends of pin 116), and handle 114 can have any shape suitable for gripping by a human hand. However, it may in some instances be desirable for these three elements to each have approximately the same shape or outer diameter in the region where they are joined to each other. For example, in the embodiment of FIGS. 1A-1B, each of these three elements has substantially the same outer diameter in region 201. Thus, when the ferrule 112, collar portion of pin 116, and handle 114 are attached to each other, each of these parts sits substantially flush with the others. This in turn prevents any of these parts from snagging or catching on other objects, reducing the risk of accidental detachment during use.

Figures 1E, 1F:
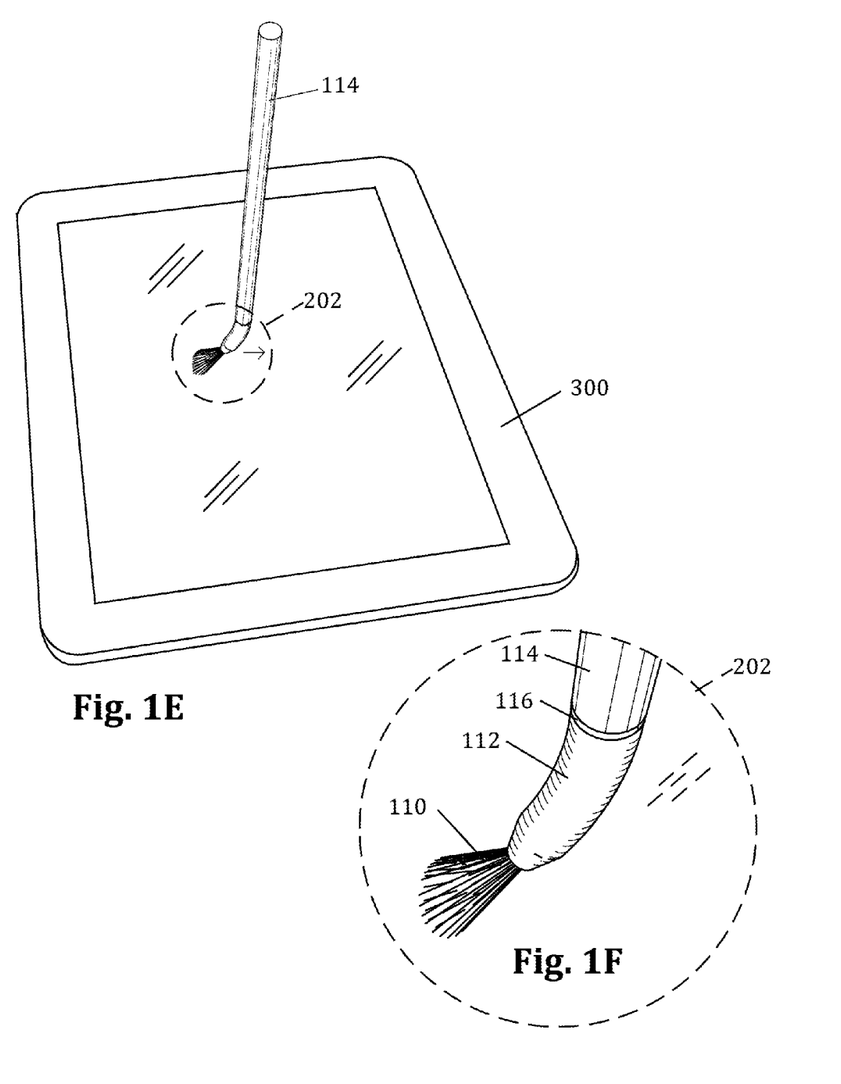
FIGS. 1E-1H illustrate use of the brush of FIGS. 1A-1D with a tablet-type computer.

Operation of the stylus 100 is further described in connection with FIGS. 1E-1F. More specifically, FIG. 1E illustrates use of the stylus 100 in conducting paint operations on tablet 300, while FIG. 1F is a magnified view of region 202 of FIG. 1E. When a user grips the stylus 100 and attempts to "paint" on tablet computer 300, both the filaments 110 and flexible ferrule 112 deform under the resulting pressure (i.e. any pressure sufficient to register a touch on tablet 300). For example, when the user attempts to create a brush stroke in the direction of the arrow in FIG. 1E, the ferrule 112 and filaments 110 are bent in the opposite direction, as shown. The deformation of the ferrule 112, as well as the fact that the recess in the tapered end of ferrule 112 surrounds the filaments 110, both act to keep filaments 110 from splaying out excessively upon the screen of tablet computer 300, thus better maintaining electrical communication between the tablet 300 and filaments 110. In this manner, the filaments 110 maintain better electrical contact with the computer 300 even under different amounts of pressure.

Figures 1G, 1H:
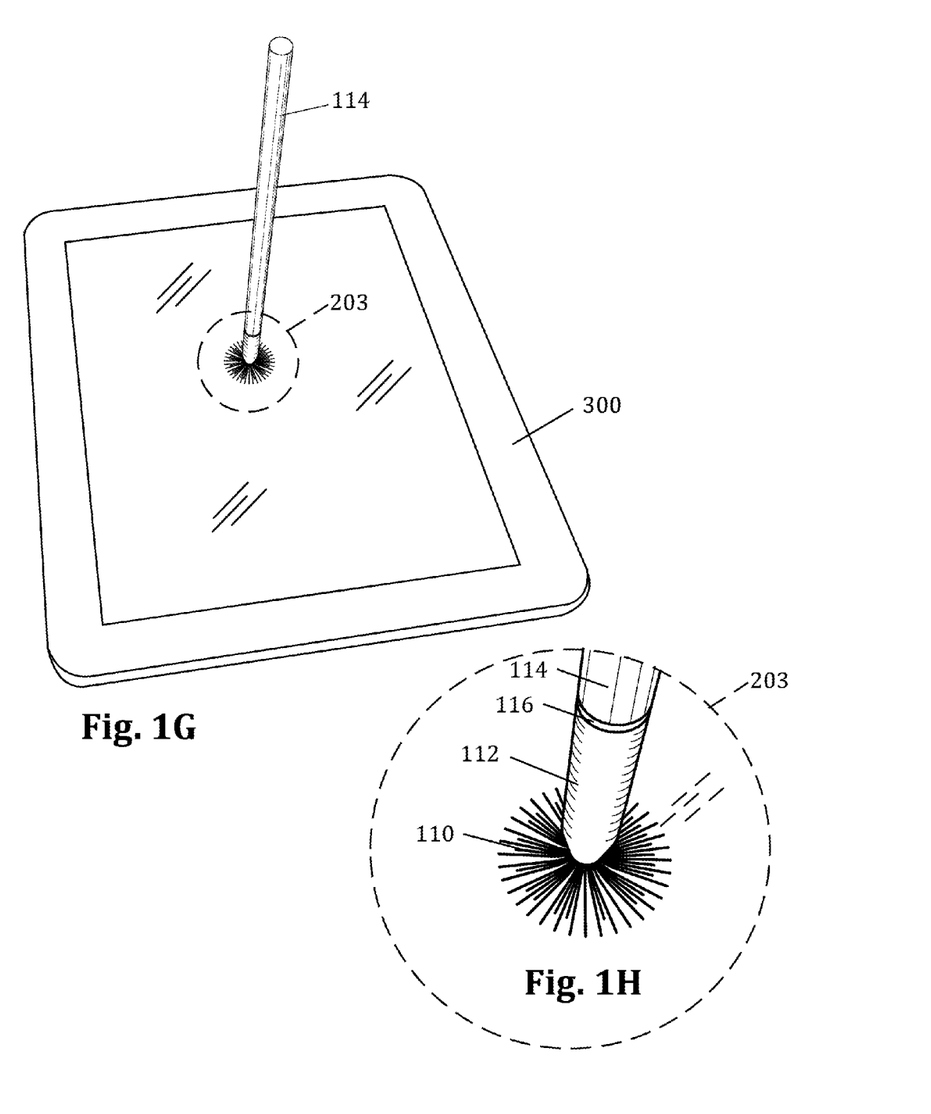

Additionally, the ferrule 112 provides the further advantage of allowing for electrical contact with the tablet 300 to be maintained even when filaments 110 are splayed apart. Often, the bristles of conventional brushes splay apart under applied pressure, resulting in loss of electrical contact with the tablet as the bristles separate. However, as shown in FIGS. 1G-1H, and in particular the magnified view of region 203 shown in FIG. 1H, even when the filaments 110 are splayed apart, the ferrule 112 itself is placed in electrical communication with the tablet 300, either via contact between the ferrule 112 and the filaments 110 near the tip of ferrule 112 which in turn contact the tablet 300, or via contact between the ferrule 112 and tablet 300 itself. Thus, embodiments of the invention allow users to continue with painting operations on tablet 300 even when they apply excessive pressure on stylus 100 and splay apart filaments 110. In this manner, brushes or styluses of embodiments of the invention allow for more reliable and continuous electrical contact with tablets 300, resulting in smoother, more continuous, and more reliable creation of brush strokes during painting operations.

Figure 2A:
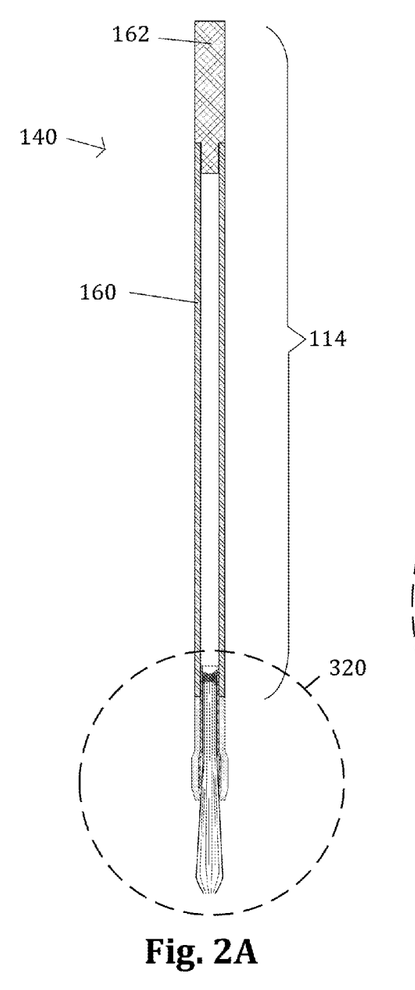
FIG. 2 is a cross-section view of a conductive brush constructed according to a second embodiment of the present invention.
Figure 2B:
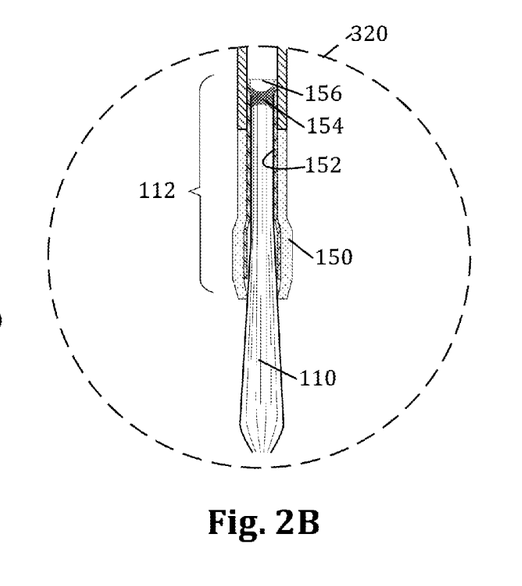

FIG. 2A is a cross-section view of a conductive brush constructed according to a second embodiment of the present invention, and FIG. 2B is a close-up view of region 320 of FIG. 2A. Here, stylus 140 includes a ferrule 112 that is not a unitary conductive body, but is instead a two-part body with a conductive core 152 surrounded by a flexible outer conductive sheath 150. Similarly, handle 114 is not a single unitary body, but instead includes a conductive tube 160 with a wooden end piece 162.

In more detail, the ferrule 112 has an inner conductive core 152 that can be flexible or rigid. For example, core 152 can be a metal tube. This tube is surrounded by flexible outer conductive sheath 150. An end portion 156 also encloses one end of the core 150, as shown. The filaments 110 are inserted into the conductive core 152 to the end portion 156, where they are bonded to the end portion 156 and the conductive core 152 by a conductive adhesive 154. The flexible outer conductive sheath 150 extends beyond the bottom most end of core 152, so that a portion of the sheath 150 contacts, or can contact, the filaments 110 as shown. Similar to the flexible ferrule of the previous embodiment of the invention, this helps to keep the filaments 110 from splaying out when the filaments 110 are pressed against the tablet 300. Additionally, even if the filaments 110 are made to splay apart, one of ordinary skill can observe that this configuration allows the outer sheath 150 to maintain electrical contact with tablet 300 as described above. That is, the outer sheath 150 continues to act as a stylus even when the filaments 110 are splayed apart, so that the brush continues to "paint" even when the filaments 110 are widely separated. In this manner, styluses of the invention can continue to conduct painting operations even in conditions when other styluses would not, i.e. when filaments 110 are splayed apart.

The top most end of the core 152 extends beyond the sheath 150. This exposed end of core 152 acts similar to the exposed pin 116 of FIGS. 1C-1D, and slides into the conductive tube 160 to provide both a mechanical and an electrical connection between the conductive tube 160 and the filaments 110. That is, the outer diameter of conductive core 152 is sized to correspond to the inner diameter of conductive tube 160, so that sliding the core 152 into the tube 160 results in a fit that provides an electrical contact. Here, ferrule 112 is glued into tube 160, although any suitable means of attachment is contemplated.

Various materials can be employed for the various parts of stylus 140. For example, the outer sheath 150 can be made of a flexible conductive material such as a conductive elastomer, although since the inner core 152 is conductive, the sheath 150 can also be made of an insulator, such as a conventional flexible plastic or polymer. The core 152 can be any conductive material, e.g. a metal such as copper or aluminum, carbon fiber, or the like. The same is also true of the conductive tube 160. The end piece 162 can be any suitable insulator or conductor. For example, the end piece 162 can be made of wood, a metal, a polymer, or carbon fiber. Alternatively, the end piece 162 can be omitted, and the top most end of the tube 160 can simply be extended and/or closed off.

Figure 3A:
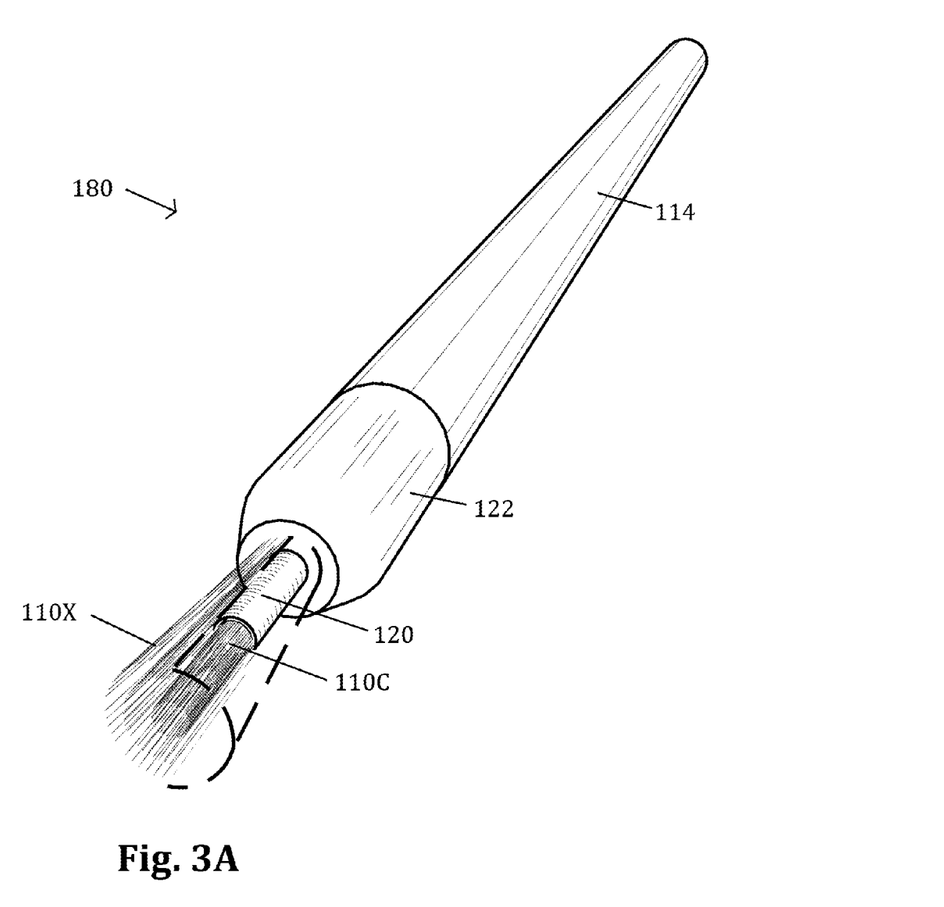
FIG. 3A is an isometric view of a conductive brush constructed according to a third embodiment of the present invention.
Figures 3B, 3C:
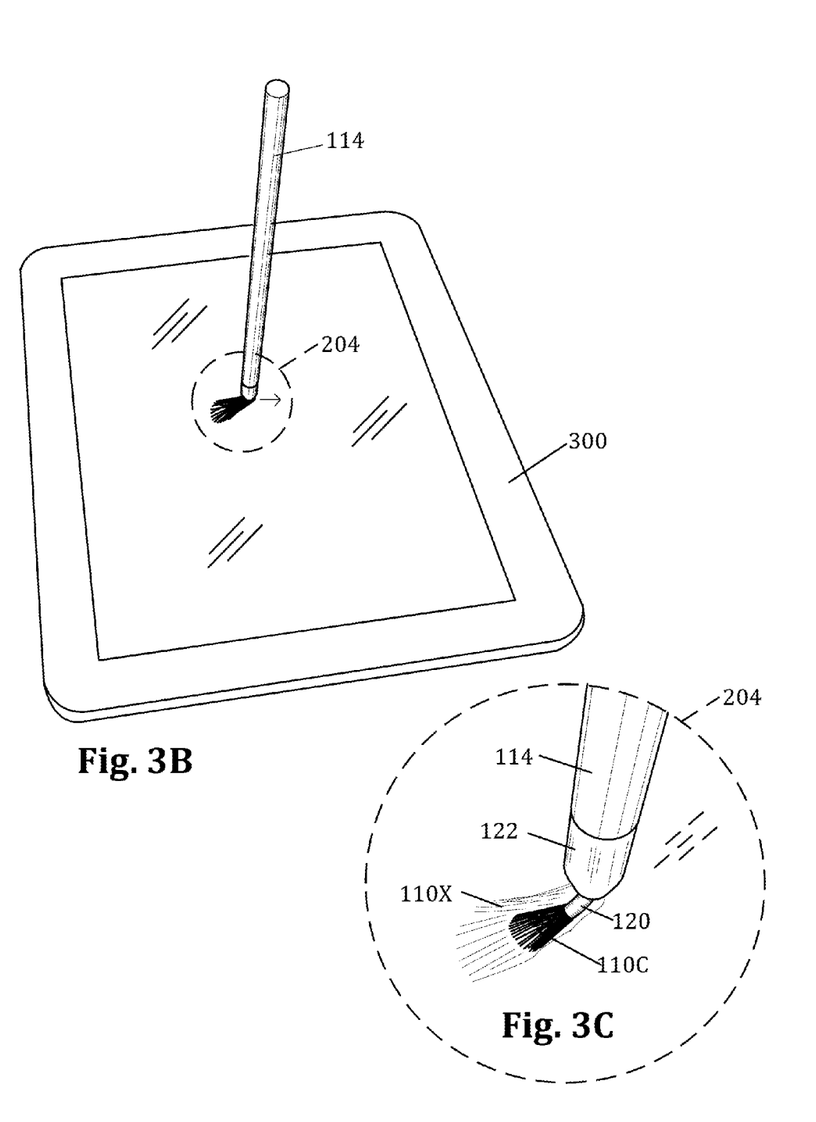
FIGS. 3B-3C illustrate use of the brush of FIG. 3A.

FIG. 3A illustrates a conductive brush constructed according to a third embodiment of the present invention, FIG. 3B illustrates use of the brush of FIG. 3A on tablet 300, and FIG. 3C is a close-up view of region 204 of FIG. 3B. As in previous embodiments, this stylus 180 has a ferrule 122 connected to a handle 114. However, in this embodiment, the ferrule 122 also has a flexible conductive tube 120 extending from its tapered front end. A first set of filaments 110C is bonded to the ferrule 122 within the tube 120, and a second set of filaments 110X is bonded to the ferrule 122 outside the tube 120, as shown. In this manner, the first set of filaments 110C extends from the tube 120, and the second set of filaments 110X extends from the ferrule 122 to surround the first set of filaments. Here, both sets of filaments 110C, 110X can be bonded to their respective portions of the ferrule 122 via a conductive adhesive.

As the tube 120 is a flexible tube, the ferrule 122 need not necessarily be flexible. The invention thus contemplates that ferrule 122 can be either flexible or rigid. Thus, for example, ferrule 122 can be made of a conductive elastomer, carbon fiber, or a metal. If the tube 120 is to be flexible, it can be made of any flexible conductive material, such as a conductive elastomer. The ferrule 122 can also be constructed as a unitary body, or can be a composite structure with multiple different materials, such as a conductive outer shell with a wooden core. The ferrule 122 can be attached to the handle 114 in any manner. For instance, the ferrule 122 can be removably attached to the handle 114 such as by use of a pin 116 as above, or it can be directly attached to the handle 114 such as by a conductive adhesive.

The operation of this stylus 180 is similar to that of previous embodiments. When the user paints in the direction of the arrow in FIG. 3B, the filaments 110C, 110X and flexible tube 120 deform as shown, while the tube 120 holds the filaments 110C together, thus maintaining more consistent contact with tablet 300. Also, the presence of the additional flexible conductive tube 120 allows the stylus 180 to accommodate filaments 110C, 110X that are longer than those of previous embodiments. In particular, the flexible tube 120 acts as a second internal ferrule that helps keep the longer filaments 110C, 110X intact while pressure is exerted on the stylus 180 (i.e., during painting). The longer filaments 110C, 110X of stylus 180 can thus provide different visual effects than brushes with shorter bristles, as desired. Finally, either the tip of ferrule 122 or the tube 120 can contact the tablet 300 even when the filaments 110C, 110X are splayed apart, so that the stylus 180 can maintain electrical contact with the tablet 300 even when the filaments 110C, 110X are splayed apart. Thus, as above, the stylus 180 can continue to generate brush strokes on tablet 300 even under conditions in which many other brushes would not.

Figures 4A, 4B, 4C:
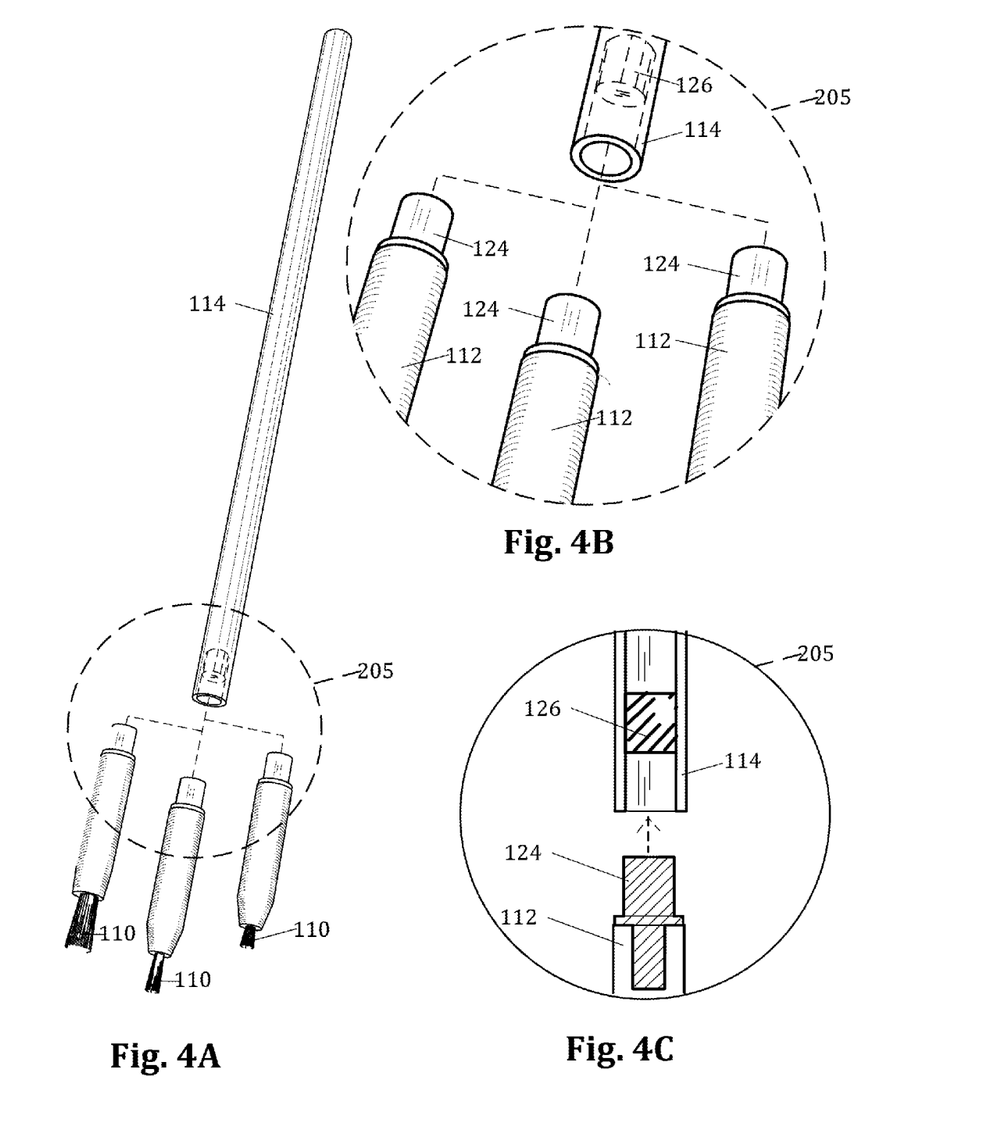
FIGS. 4A-4C illustrate a fourth embodiment of the invention, highlighting the interchangeability of different ferrules.

FIGS. 4A-4C illustrate a fourth embodiment of the invention, highlighting the interchangeability of different ferrules. In particular, FIG. 4A illustrates a number of ferrules 112, or brush heads, that can be swapped in or out of handle 114, and FIGS. 4B-4C are magnified views of region 205 of FIG. 4A. Here, different ferrules 112 are configured as described in the various embodiments above, except that the ferrules 112 each include a ferrous metal pin 124 that is attached to the ferrule 112 in a manner that places it in electrical connection with its filaments 110. For example, the pins 124 can be press-fit into conductive ferrules 112, or bonded to the ferrules 112 with a conductive adhesive.

The handle 114 has a magnet 126 affixed within, such as by a conductive adhesive. This magnet 126 provides an attractive force on the pins 124, thus holding the ferrule 112 securely on the end of the handle 114. The magnet 126 can be positioned so as to make contact with the pin 124 when it is inserted into the handle 114, thus providing a part of the electrical connection between handle 114 and filaments 110. Alternatively, or in addition, the pin 124 can be sized to correspond to the inner surface of handle 114, so that electrical connection is established by contact between this inner surface and the pin 124. The presence of magnet 126 and pins 124 allows for multiple different ferrules 112 to be easily swapped, while still allowing for secure attachment to the handle 114 and reliable electrical connection therewith.

Figure 5A:
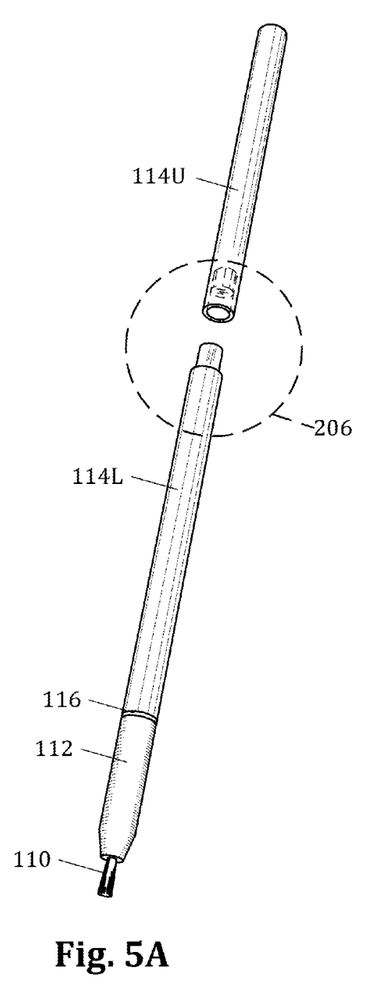
FIGS. 5A-5B illustrate an exemplary fifth embodiment comprising a multi-part handle.
Figure 5B:
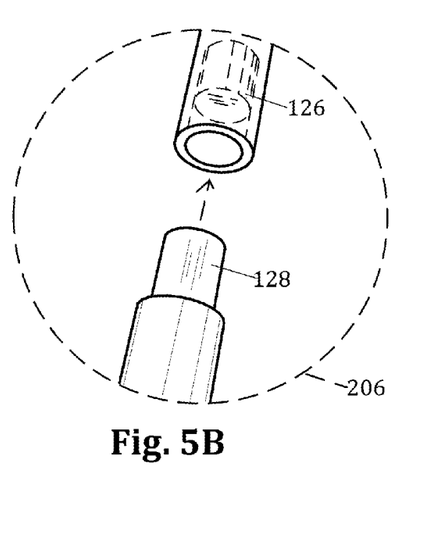

FIGS. 5A-5B illustrate an exemplary fifth embodiment of the invention. The stylus of this embodiment has a collapsible two-part handle that can be easily broken down for more convenient transport. A lower handle 114L has a first end that has a pin 116 for connection to ferrule 112 as above, and a second end for connection to an end of upper handle 114U. FIG. 5B is a magnified view of section 206 of FIG. 5A, which shows the connection between the two handles 114L, 114U. As shown in section 206, the upper handle 114U has a magnet 126 affixed to its inner surface, while the second end of lower handle 114L has a ferrous metal pin 128 extending therefrom. The pin 128 is sized so that it can be inserted into upper handle 114U to create an electrical connection with the inner surface of upper handle 114U and/or the magnet 126. The magnet 126 can be positioned to contact the pin 128, and can be affixed to the upper handle 114U with a conductive adhesive. This configuration allows the two handles 114L, 114U to be joined together and held securely in place during use, but to be easily separable and collapsible for simpler transport.

FIGS. 6-9 are isometric views of a conductive brush constructed according to further embodiments of the present invention. In particular, FIG. 6A illustrates a brush having a particular handle construction, FIG. 6B is a close-up view of region 207 of FIG. 6A, and FIGS. 7-9 are close-up views of the same region 207, but with various alternative handle configurations. In these Figures, the brushes are constructed with conductive tips that can be used to draw or paint upon tablet 300. In FIG. 6A, handle 114 has ferrule 112 affixed to one end, while the other end has a conductive tip 130 extending therefrom. The conductive tip 130 can be used to draw or paint upon the tablet 300 in lieu of the filaments 110. This tip 130 can be used in situations where the filaments 110 may not be desired, such as in providing quick taps or touches to the screen of the tablet 300, or to press buttons. Additionally, the tip 130 can be used in drawing or paint programs to provide a different visual (and tactile) effect from the filaments 110.

Figures 6A, 6B, 7, 8, 9:
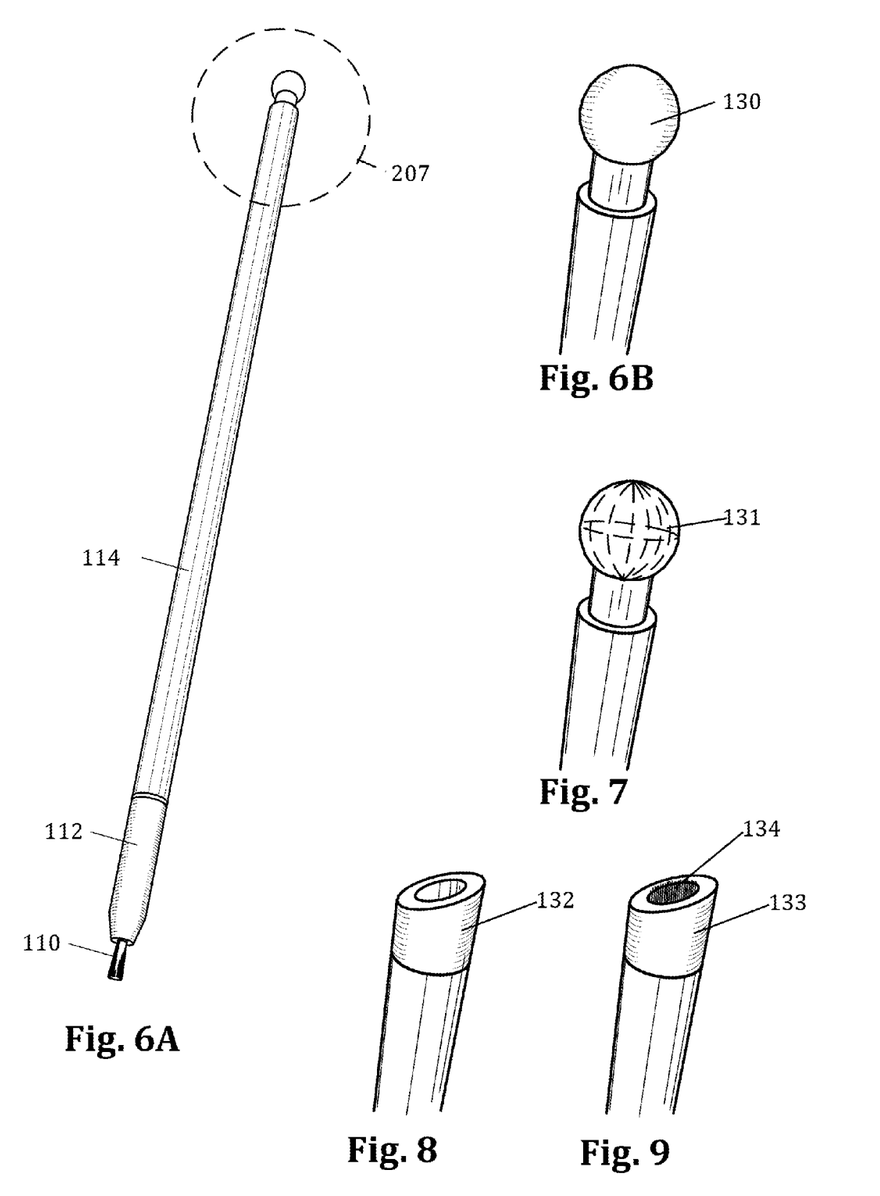

FIG. 6B shows a close-up view of region 207. Here, the handle 114 is formed with a tip 130 made of a conductive elastomer. This tip 130 can be sized similar to a human fingertip, and may be made of an elastomer having a similar hardness (e.g., a Shore A durometer of about 5 to about 25), so that the tip 130 produces visual effects similar to that of painting with a human finger. Alternatively, FIG. 7 illustrates a tip configured substantially as a conductive sphere 131 made of a clear transparent conductive elastomer, so that the sphere 131 does not obstruct the user's drawing, allowing the user to better see his or her line work.

The conductive tip may be made of any suitable conductive material. Additionally, the tip need not necessarily be a sphere, and the invention is not limited to any particular shape or configuration of conductive tip. For example, FIG. 8 describes an angled conductive tip 132.

The angled tip 132 is shaped generally as a cylinder with an angled end, a shape which allows for painting or drawing with a relatively small surface area of tip 132 that contacts the screen of tablet 300. That is, the angled shape of tip 132 allows users to draw/paint with only the sharp end of the tip 132 (i.e., the upper rightmost portion of tip 132 in FIG. 8), so that thin and sharp lines can be drawn. As another example, FIG. 9 illustrates an angled conductive tip 133 similar to conductive tip 132 of FIG. 8, but with additional conductive bristles 134 placed inside. The bristles 134 protrude slightly from the upper surface of conductive tip 133 as shown, and have a much lower coefficient of friction with the surface of tablet 300 than does the tip 133.

In many cases, the conductive material used for tip 133 has an excessive coefficient of friction with the tablet 300, making it difficult for users to slide the tip 133 across the surface of the tablet 300. The presence of the bristles 134 allows the tip 133 to slide partially on the bristles 134, reducing the amount of friction generated. That is, the bristles 134 protrude slightly from the upper surface of the tip 133, so that when the tip 133 is pressed against tablet 300, both the bristles 134 and angled end of tip 133 contact the tablet 300. In this manner, both the bristles 134 and tip 133 slide against the tablet 300, so that the overall effective coefficient of friction between the tablet 300 and the bristle 134/tip 133 combination is lower than that between the tablet 300 and only tip 133. The presence of bristles 134 thus makes drawing with tip 133 somewhat easier.

Additionally, the problem of excessive friction between tablet 300 and the material of tip 133 has often been solved by adding a low-coefficient of friction material to the material of tip 133, e.g. Teflon®, talcum powder, or the like. That is, it is possible to reduce the amount of friction generated by tip 133 by adding a low-coefficient of friction material to the elastomeric conductive material of tip 133. However, this adds time and complexity, and thus expense, to the fabrication of tip 133. Also, these added materials often tend to decrease the conductive properties and durability of conductive elastomerics. These drawbacks can be largely avoided by foregoing the addition of low-coefficient of friction material to the elastomeric conductive material of tip 133, and instead adding bristles 134. Thus, the added bristles 134 prevent the use of undesirable added materials to the conductive elastomer of tip 133, allowing for improved conductive properties and durability, as well as reduced expense.

Aspects of the invention also encompass methods for producing computer-generated brush strokes. As the filaments of embodiments of the invention are not as easily splayed apart, the resulting brushes can handle a wider range of pressures, and can thus create a wider range of visual effects upon the screen of tablet 300. For example, the brushes can be used to draw both thin or light brush strokes requiring little pressure, and thick/heavy brush strokes that require more pressure. Many computerized paint programs are not capable of generating such varied brush strokes. Accordingly, the invention contemplates methods or programs for producing more varied brush strokes.

Figure 10:
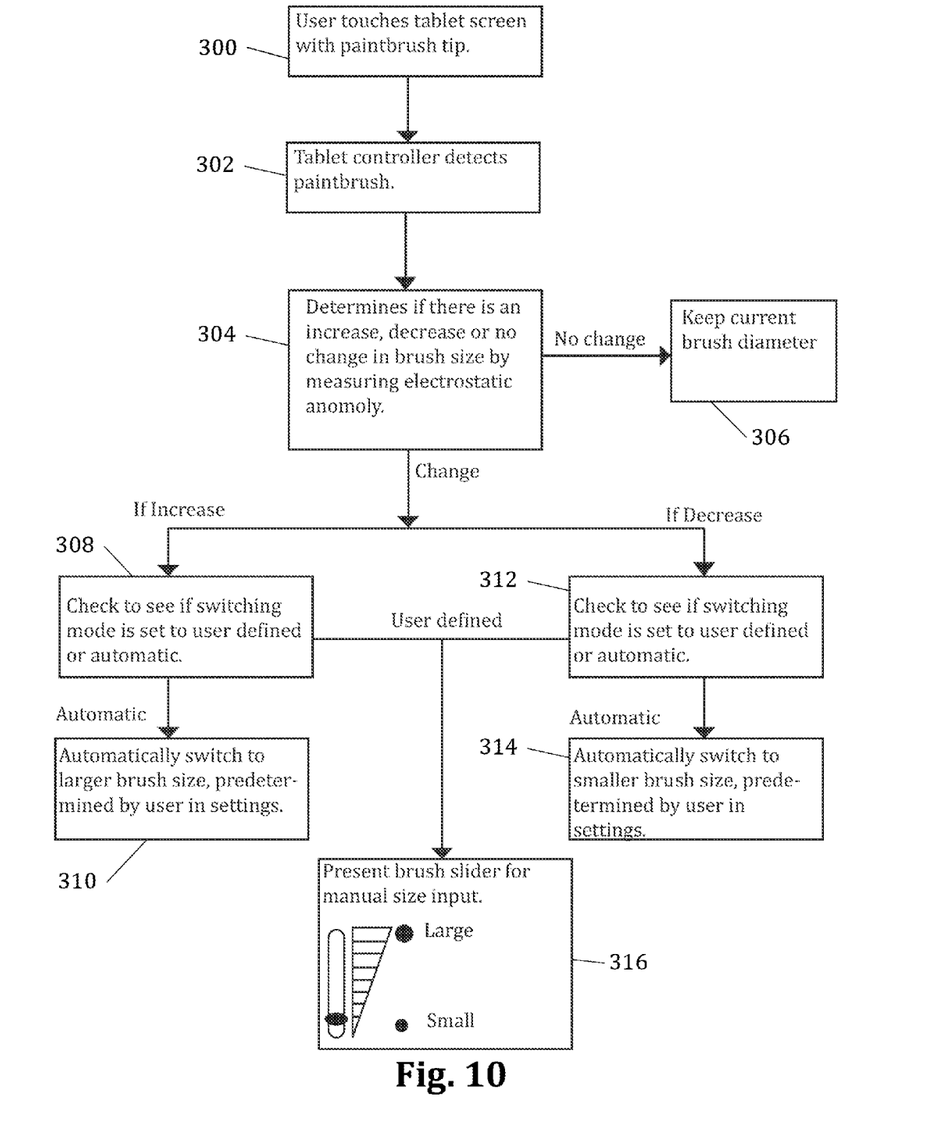
FIG. 10 is a flowchart conceptually illustrating steps taken by a paint program executed on a tablet-type computer in conjunction with brushes of the present invention.

FIG. 10 is a flowchart conceptually illustrating steps taken by a paint program that can be executed on computing devices such as a tablet-type computer, and which is capable of producing more varied brush strokes. Once the user touches the screen of tablet 300 with a paintbrush (Step 300), the controller of tablet 300 detects the presence of the brush (Step 302), and determines the size of the brush's stroke by measuring the size of the electrostatic anomaly generated by the filaments' 110 contact with the screen (Step 304). The controller then determines whether this brush stroke size is greater than, less than, or the same size as the last recorded brush stroke. If the current brush stroke is the same size as the last brush stroke, the program paints, or generates a brush stroke, using the same brush diameter as that used last (Step 306).

If the current brush stroke is larger (e.g., the diameter of the electrostatic anomaly is greater than the last-used brush diameter), a check is performed to determine whether a switching mode is set to user-defined, or automatic (Step 308). If the switching mode is set to automatic, the program automatically switches to a larger brush diameter (Step 310). The program can be set to switch to a brush diameter of its own selection, e.g. based on its comparison of the anomaly diameter to its stored brush diameters, or it can be set by the user to switch to a predetermined brush diameter. Alternatively, if the switching mode is set to user-defined, the program can present the user with a slider on the screen which allows the user to manually input his or her desired brush size (Step 316), where later brush strokes will be drawn with the selected brush size until it is reset again.

If the current brush stroke is smaller, a check is performed to determine whether a switching mode is set to user-defined, or automatic (Step 312). If the switching mode is set to automatic, the program automatically switches to a smaller brush diameter (Step 314). As with Step 310, the program can select its own brush diameter, or can be user-set to switch to a particular one. If the switching mode is set to user-defined, the program returns to Step 316 and allows the user to manually input a desired brush size.

The steps of FIG. 10 can be implemented in known manner. For example, they can be implemented as an application program executable on a tablet-type touch screen computing device. Such a program would allow users to paint, or generate paint-like images, on tablet 300, using more varied brush stroke sizes, thus allowing for creation of a wider variety of images.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, the invention encompasses any specific configuration of removable ferrule, where any portion can be conductive and any can be nonconductive, so long as an electrical connection between bristles and handle can be established by removable attachment of the ferrule to the handle. The ferrule can be made of a single unitary flexible and conductive body, such as a single molded piece of conductive elastomer, or it can have flexible/rigid and/or conductive/nonconductive parts, such as a rigid inner conductive core surrounded by a flexible outer sheath or member that helps retain the shape of the brush filaments during painting operations, i.e. during the filament deformations undergone during a typical stroke of the brush across the screen of tablet 300, when the user seeks to produce an electronic representation of a brush stroke in a paint or illustration program. Also, the various embodiments each have certain features that differ from those of other embodiments, and it is noted that the invention contemplates the mixing and matching of various features as desired.

That is, further embodiments can be formed from the selection of various features from different embodiments. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A conductive brush for use with a computing device, the brush comprising:
   a ferrule comprising an elastomer and having a first end and an opposite second end;
   electrically conductive filaments; and
   an electrically conductive handle;
   wherein the electrically conductive filaments are attached to the first end of the ferrule, and the second end of the ferrule is coupled to the handle, so as to place the electrically conductive filaments and the elastomer of the ferrule in electrical communication with the handle;
   wherein the ferrule further comprises:
      an external flexible portion; and
      a conductive internal portion having a handle end for electrical coupling to the handle, and an opposite filament end for the filaments to extend therefrom;
   wherein the filaments have first ends and opposite second ends, the first ends extend from the filament end of the internal portion, and the flexible external portion extends to a position between the filament end of the internal portion and the second ends of the filaments; and
   wherein the flexible external portion of the ferrule comprises the elastomer, and the internal portion of the ferrule comprises a metal.

2. The conductive brush of claim 1, wherein the external portion of the ferrule has a thickness that is approximately the same as that of the handle.

3. The conductive brush of claim 1, wherein the flexible external portion at least partially covers the filaments.

4. The conductive brush of claim 1, wherein the second end of the ferrule is removably attachable to the handle.

5. The conductive brush of claim 1, wherein the ferrule further comprises:
   a first portion surrounding a first set of the filaments; and
   a second portion having a second set of the filaments attached thereto, the second set of filaments surrounding the first portion of the ferrule and the first set of the filaments.

6. The conductive brush of claim 1, wherein the handle further comprises a first portion and a second portion, the first portion having a first end and an opposite second end, the first end of the first portion configured for attachment to the second end of the ferrule, and the second end of the first portion configured for attachment to the second portion, so as to place the first and second portions of the handle in electrical communication with the filaments.

7. The conductive brush of claim 1, wherein approximately half of the filaments are acrylic fibers coated with copper sulfide, and a remainder of the filaments are animal hairs.

8. The conductive brush of claim 1, wherein the handle has a first end configured for attachment to the second end of the ferrule, and a second end having an electrically conductive tip.

9. The conductive brush of claim 8, wherein the electrically conductive tip has a first surface proximate to the second end and a second surface opposite to the first surface, and wherein a plurality of bristles extends from the second end of the bristles through the electrically conductive tip, so as to extend beyond the second surface of the electrically conductive tip.

* * * * *